United States Patent
Byun et al.

(10) Patent No.: US 7,355,812 B2
(45) Date of Patent: Apr. 8, 2008

(54) DISK DRIVE HAVING ANTI-SHOCK STRUCTURE

(75) Inventors: Yong-kyu Byun, Yongin-si (KR); Dong-ho Oh, Seoul (KR); Min-pyo Hong, Suwon-si (KR); Jeong-seok Koh, Yongin-si (KR)

(73) Assignee: Institute for Information Technology Advancement, Yuseong-gu (KR)

( * ) Notice: Subject to any disclaimer, the term of this patent is extended or adjusted under 35 U.S.C. 154(b) by 385 days.

(21) Appl. No.: 10/963,554

(22) Filed: Oct. 14, 2004

(65) Prior Publication Data
US 2005/0111134 A1    May 26, 2005

(30) Foreign Application Priority Data
Nov. 22, 2003  (KR) ............................... 2003-83358

(51) Int. Cl.
*G11B 33/14* (2006.01)
(52) U.S. Cl. ................. 360/97.02; 360/97.01
(58) Field of Classification Search ............. 360/97.01, 360/97.02, 97.03, 98.01, 99.08; 720/651, 720/692, 695–698
See application file for complete search history.

(56) References Cited

U.S. PATENT DOCUMENTS

| | | | | |
|---|---|---|---|---|
| 5,790,344 A | * | 8/1998 | Allen | 360/97.02 |
| 6,256,165 B1 | * | 7/2001 | Kim | 360/97.01 |
| 6,399,179 B1 | * | 6/2002 | Hanrahan et al. | 428/131 |
| 6,407,879 B1 | | 6/2002 | Fruge' et al. | |
| 6,501,615 B1 | * | 12/2002 | Kelsic et al. | 360/97.02 |
| 6,950,275 B1 | * | 9/2005 | Ali et al. | 360/97.02 |
| 2001/0002157 A1 | * | 5/2001 | Wakita et al. | 360/97.01 |
| 2002/0085309 A1 | * | 7/2002 | Byun et al. | 360/97.01 |

FOREIGN PATENT DOCUMENTS

| | | | |
|---|---|---|---|
| JP | 63211166 A | * | 9/1988 |
| JP | 2002-0055371 A | | 7/2002 |

* cited by examiner

*Primary Examiner*—Andrea Wellington
*Assistant Examiner*—Carlos E Garcia
(74) *Attorney, Agent, or Firm*—Sughrue Mion, PLLC

(57) ABSTRACT

A disk drive having an anti-shock structure is provided. The disk drive includes: a base member; a spindle motor supported by a spindle motor support formed on the base member, the spindle motor rotating a data storage disk; an actuator rotatably coupled to an actuator pivot supported by a pivot support formed on the base member, the actuator moving a read/write head to a position on a recording surface of the disk; and slots formed in the base member around the circumference of each of the spindle motor support and the pivot support, the slots for partially controlling the stiffness of the base member. The slots include a first slot formed on a circumference region of the spindle motor support near the pivot support, and a second slot formed on a circumference region of the pivot support opposite to the spindle motor support. Due to the structure of the disk drive, the spindle motor and the actuator pivot are inclined in the same direction when an external impact is applied. Therefore, a collision between the head and the disk, i.e., a head slap, is unlikely to occur, thereby minimizing damage to the head and the disk caused by the head slap.

21 Claims, 8 Drawing Sheets

DISK DRIVE HAVING ANTI-SHOCK STRUCTURE

This application claims the priority of Korean Patent Application No. 2003-83358, filed on Nov. 22, 2003, in the Korean Intellectual Property Office, the disclosure of which is incorporated herein in its entirety by reference.

BACKGROUND OF THE INVENTION

1. Field of the Invention

An apparatus consistent with the present invention relates to a disk drive and, more particularly, to a disk drive having an anti-shock structure for minimizing the collision between a head and a disk caused by an external impact.

2. Description of the Related Art

A hard disk drive is a data storage device used for reproducing/recording data from/on a rotating disk. A read/write head is mounted on an actuator and reproduces/records data on the rotating disk while being raised from a recording surface of the rotating disk by a predetermined height and moving to a predetermined location.

Recently, there has been an increasing demand for portable data storage devices. For a portable data storage device having a rotary actuator, it is desired to prevent the read/write head and a recording medium, such as, a disk, from colliding due to an external impact and thus damaging the head and the disk due to the collision.

Figure 1:
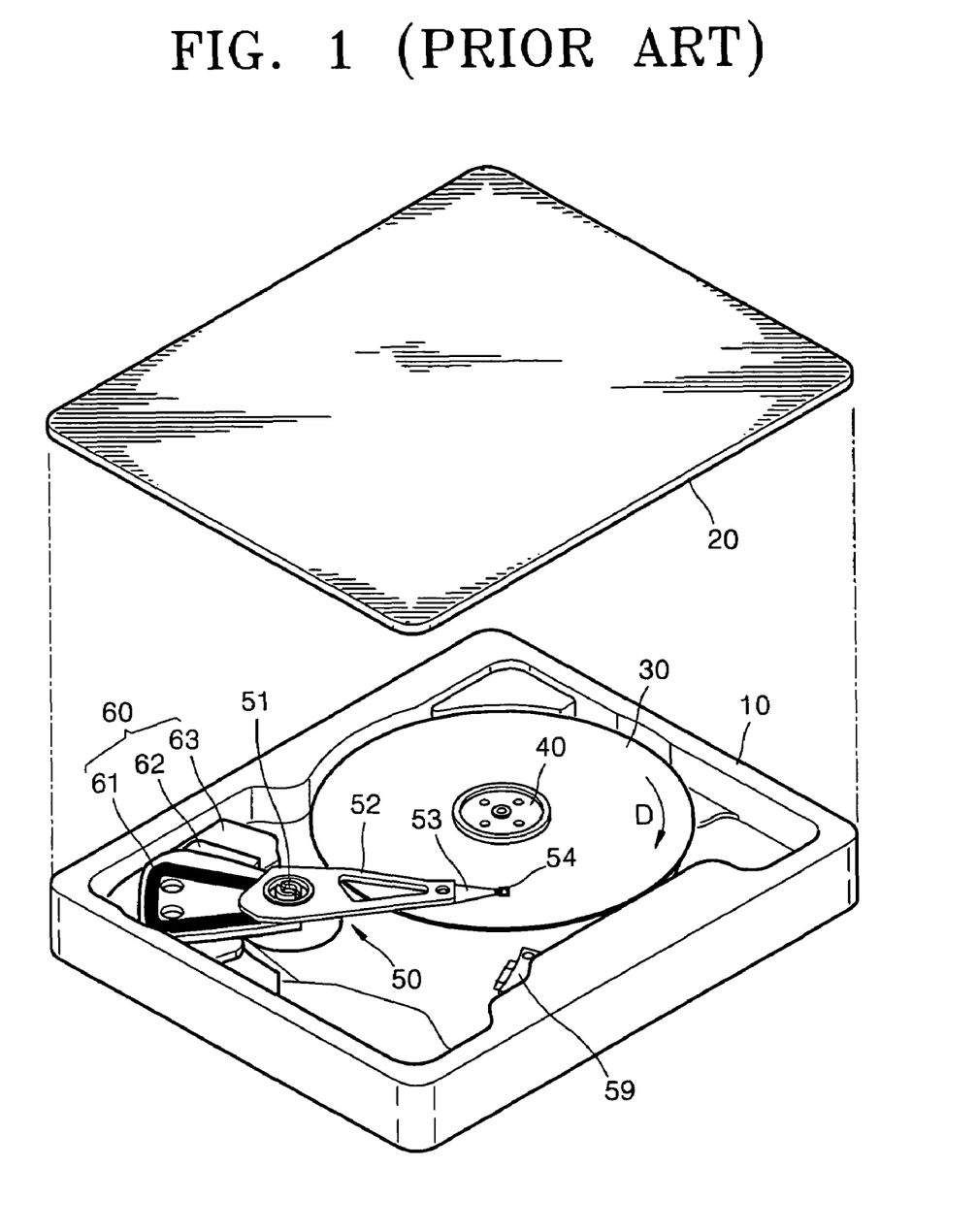
FIG. 1 is a schematic perspective view of an example of a conventional hard disk drive.
Figure 2:
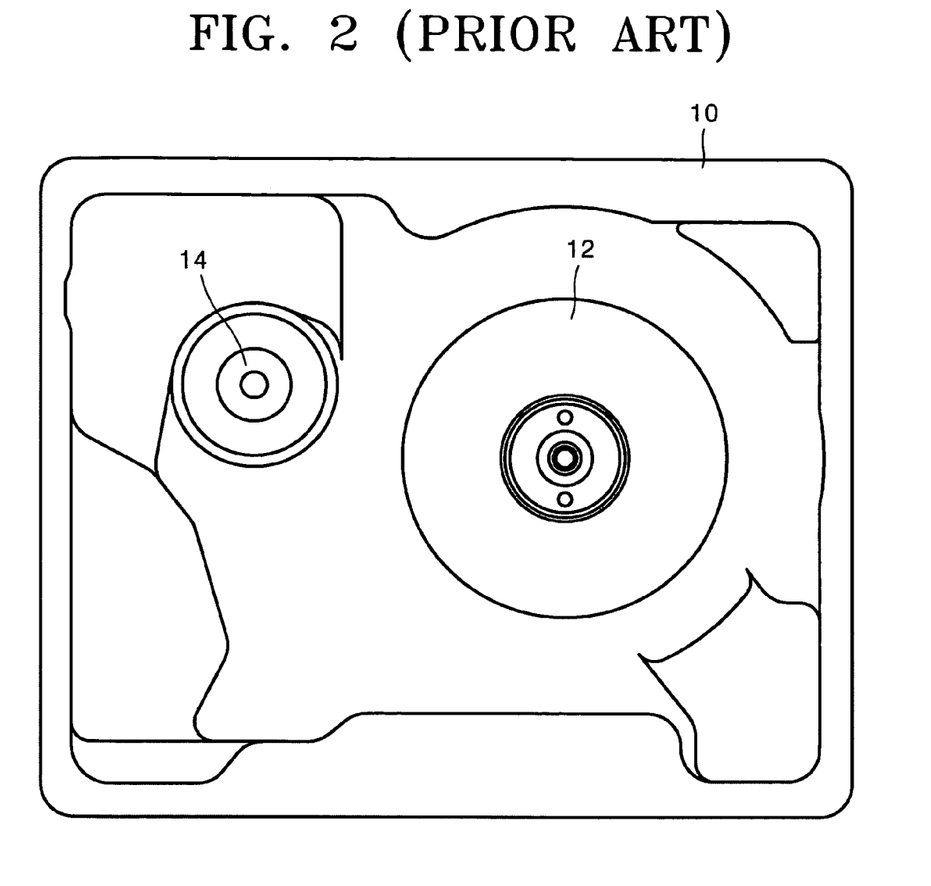
FIG. 2 is a plan view of a base member of the conventional hard disk drive shown in FIG. 1.

FIG. 1 is a schematic perspective view of an example of a conventional disk drive; FIG. 2 is a plan view of a base member of the disk drive shown in FIG. 1; and FIG. 3 is a vertical sectional view of the disk drive shown in FIG. 1.

Figure 3:
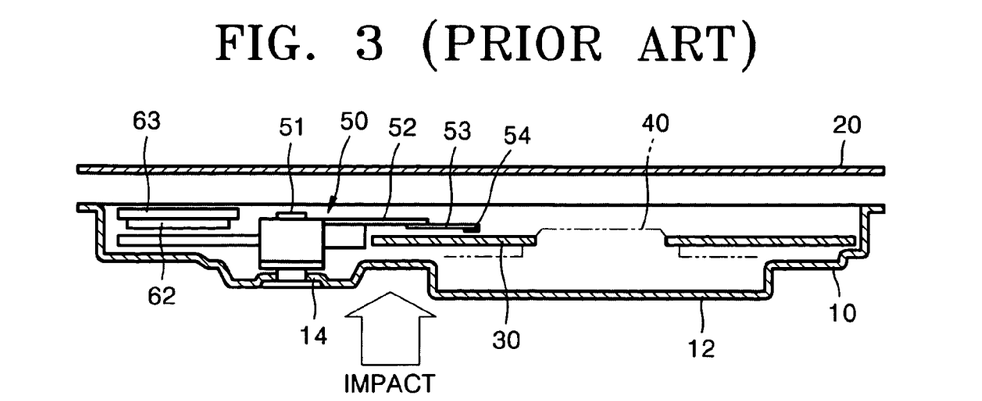
FIG. 3 is a vertical sectional view of the conventional hard disk drive shown in FIG. 1.

Referring to FIGS. 1, 2 and 3, the conventional hard disk drive includes a base member 10, a cover member 20, a spindle motor 40, and an actuator 50.

The spindle motor 40 for rotating the disk 30 is formed on the base member 10. To this end, a support 12 for the spindle motor 40 is mounted on the base member 10. The actuator 50 for moving a read/write head mounted on a slider 54 to a predetermined location on the disk 30 is rotatably installed on the base member 10. To this end, a pivot support 14 is formed on the base member 10, and an actuator pivot 51 is installed on the pivot support 14. An actuator arm 52 is coupled to the actuator pivot 51. A suspension 53 for elastically-biasing the slider 54 toward the surface of the disk 30 is installed at a front end of the actuator arm 52. The actuator 50 has a voice coil motor (VCM) 60 for rotating the actuator arm 52. The VCM 60 includes a VCM coil 61 coupled to a rear end of the actuator arm 52 and a magnet 62 facing to the VCM coil 61. The magnet 62 is usually attached to a yoke 63.

The VCM 60 rotates the actuator arm 52 in a direction conforming to Fleming's left hand rule by the interaction between a current flowing through the VCM coil 61 and a magnetic field formed by the magnet 62.

In particular, when the hard disk drive is turned on and thus the disk 30 rotates in the direction of an arrow D, the VCM 60 rotates the actuator arm 52 counterclockwise so that the slider 54 on which the head is mounted moves onto the recording surface of the disk 30. Meanwhile, when the hard disk drive is turned OFF and the disk 30 stops rotating, the VCM 60 rotates the actuator arm 52 clockwise so that the slider 54 deviates from the recording surface of the disk 30. After escaping from the recording surface of the disk 30, the head lands on a ramp 59 placed outside the disk 30.

In such a conventional hard disk drive, however, if an external impact is applied to the base member 10 in a direction approximately vertical with respect to the base member 10 with the slider 54 being located above the surface of the disk 30, the front end of the actuator 50 is bent down so that an intense rebounding force works between the slider 54 and the disk 30. For this reason, when the slider 50 moves down at a fast speed due to the resilience of the actuator arm 52 and the suspension 53 in the state where the head and the disk 30 are separated, the head collides with the surface of the disk 30. This is referred to as a "head slap", which damages the head mounted on the slider 54 and the surface of the disk 30 and decreases the head's read/write performance.

SUMMARY OF THE INVENTION

Illustrative, non-limiting embodiments of the present invention overcome the above disadvantages and other disadvantages not described above. Also, the present invention is not required to overcome the disadvantages described above, and an illustrative, non-limiting embodiment of the present invention may not overcome any of the problems described above.

An apparatus consistent with the present invention provides a disk drive having an anti-shock structure for minimizing a head slap caused by an external impact, which damages a head and a disk.

According to an aspect of the present invention, there is provided a disk drive comprising: a base member; a spindle motor supported by a spindle motor support formed on the base member, the spindle motor rotating a data storage disk; an actuator rotatably coupled to an actuator pivot supported by a pivot support formed on the base member, the actuator moving a read/write head to a position on a recording surface of the disk; and at least one slot formed in the base member around the circumference of each of the spindle motor support and the pivot support, the slots for partially controlling the stiffness of the base member.

The slots may comprise: a first slot formed on a circumference region of the spindle motor support near the pivot support; and a second slot formed on a circumference region of the pivot support opposite to the spindle motor support. In this case, the first slot may be elongated near and along the circumference of the spindle motor support, and the second slot may be elongated near and along the circumference of the pivot support. A length of the first slot may range from one fourth to one half of the circumference of the spindle motor support, and a length of the second slot may range from one fourth to one half of the circumference of the pivot support.

At least one first auxiliary slot may be formed on a circumference region of the spindle motor support opposite to the first slot, and at least one second auxiliary slot may be formed on a circumference region of the pivot support opposite to the second slot. A plurality of first auxiliary slots and a plurality of second auxiliary slots may be formed. The first auxiliary slot may be shorter than the first slot, and the second auxiliary slot may be shorter than the second slot.

Due to the structure of the disk drive consistent with the present invention, the spindle motor and the actuator pivot are inclined in the same direction when an external impact is applied to the disk drive, so that a collision between the head and the disk, i.e., a head slap, is unlikely to occur.

BRIEF DESCRIPTION OF THE DRAWINGS

The above and other features and advantages of the present invention will become more apparent by describing in detail exemplary embodiments thereof with reference to the attached drawings, in which.

DETAILED DESCRIPTION OF ILLUSTRATIVE, NON-LIMITING EMBODIMENTS OF THE INVENTION

Illustrative, non-limiting embodiments of a disk drive having an anti-shock structure consistent with the present invention will be described in detail with reference to the appended drawings. Identical numerals in the drawings indicate identical elements.

Figure 4:
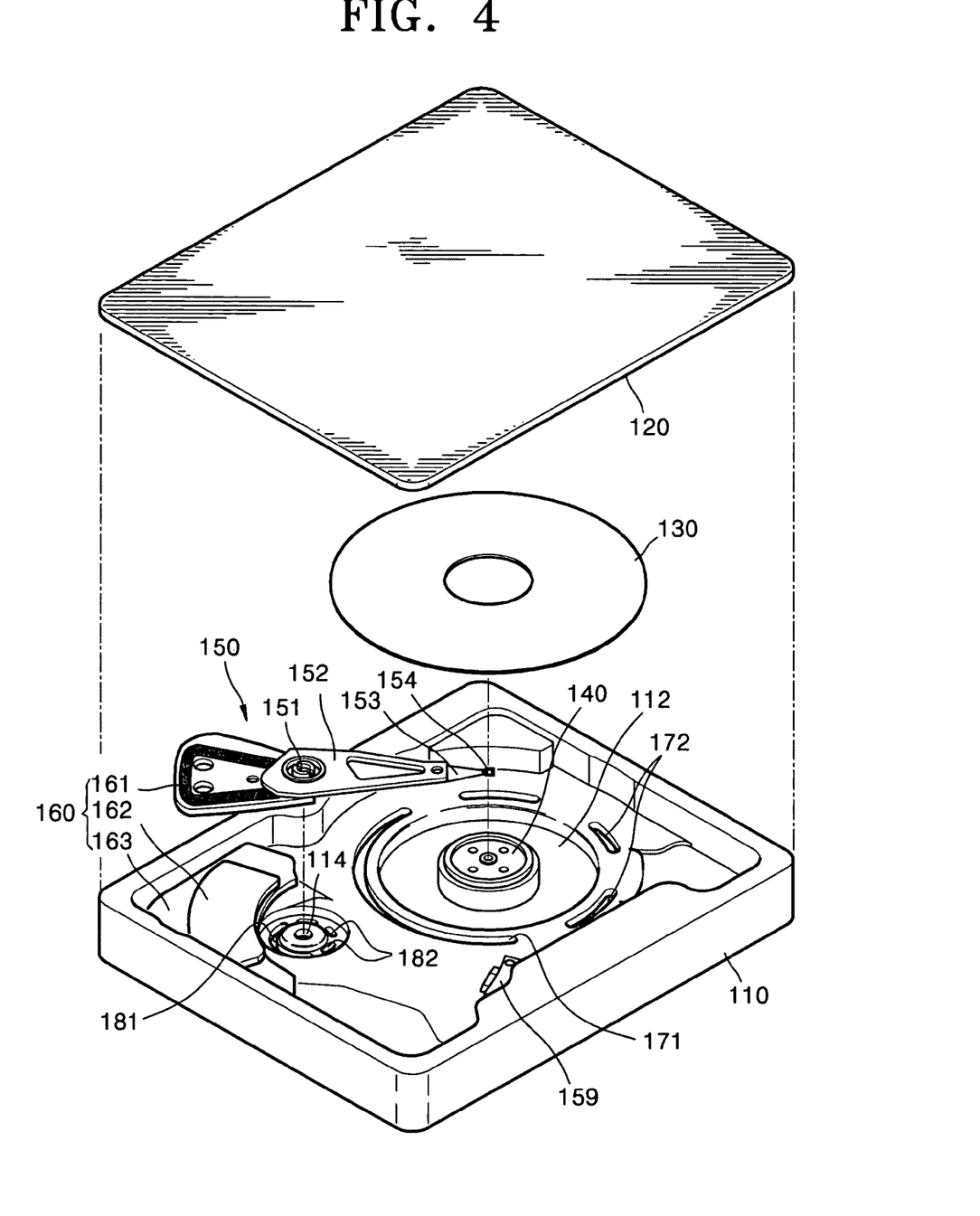
FIG. 4 is an exploded perspective view of a hard disk drive according to an exemplary embodiment the present invention.
Figure 5:
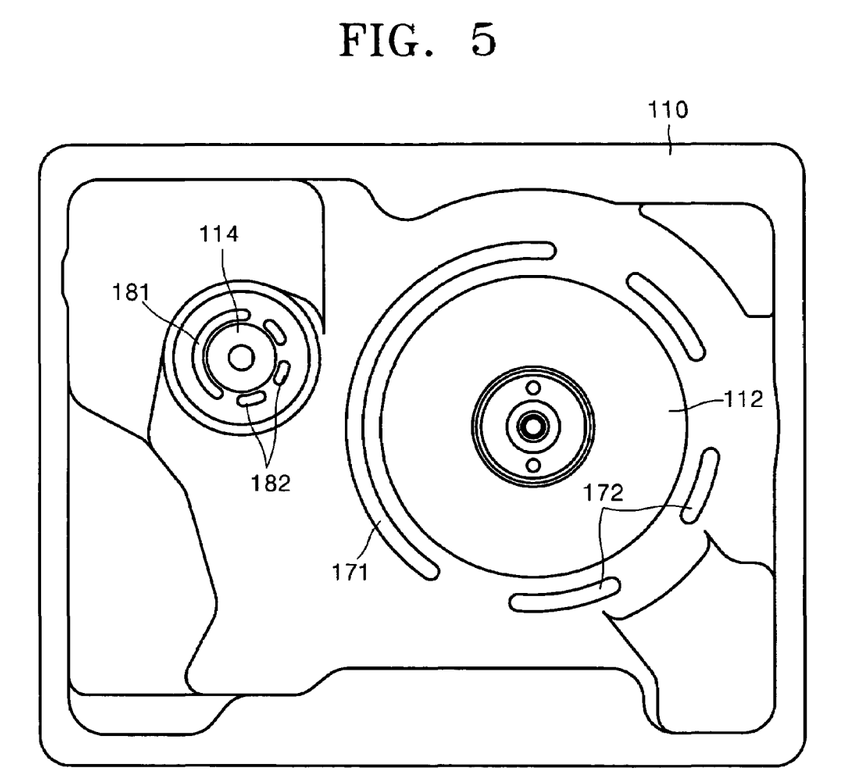
FIG. 5 is a plan view of a base member of the hard disk drive shown in FIG. 4.
Figure 6:
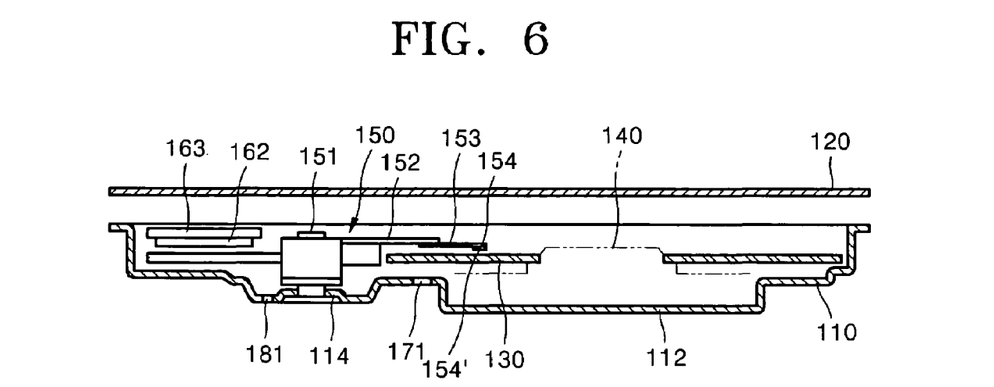
FIG. 6 is a vertical sectional view of the hard disk drive shown in FIG. 4.

Referring to FIGS. 4, 5 and 6, a hard disk drive according to an exemplary embodiment of the present invention includes a base member 110 and a cover member 120. A spindle motor 140 for rotating a disk 130 and an actuator 150 for moving a read/write head 154' mounted on a slider 154 to a predetermined location of the disk 130 are installed on the base member 110.

The cover member 120 is coupled to the base member 110 to protect the disk 130 and the actuator 150. In general, the base member 110 and the cover member 120 are made, for example, of aluminium.

The actuator 150 includes: an actuator arm 152 rotatably coupled to an actuator pivot 151 installed on the base member 110; and a suspension 153 installed at a front end of the actuator arm 152 for elastically biasing the slider 154 on which the head is mounted toward the disk 130. The actuator 150 has a voice coil motor (VCM) 160 for rotating the actuator arm 152. The VCM 160 includes a VCM coil 161 coupled to a rear end of the actuator arm 152, and a magnet 162 arranged facing the VCM coil 161 and attached to a yoke 163.

While being controlled by a servo control system, the VCM 160 rotates the actuator arm 152 in a direction according to Fleming's left hand rule by the interaction between a current flowing the VCM coil 161 and a magnetic field formed by the magnet 162.

Specifically, when the hard disk drive is turned on and the disk 130 starts to rotate, the VCM 160 rotates the actuator arm 152 counterclockwise so that the slider 154 moves above the recording surface of the disk 130. The slider 154 is lifted a predetermined height above the surface of the disk 130 by the lift force produced by the rotating disk 130. In this state, the head mounted on the slider 154 records/reproduces data on/from the recording surface of the disk 130.

Meanwhile, when the hard disk drive is turned off and the disk 130 stops rotating, the VCM 160 rotates the actuator arm 152 clockwise so that the slider 154 departs from the recording surface of the disk 130. To land the head departing from the recording surface of the disk 130, a ramp 159 is provided outside the disk 130. Instead of the ramp 159, a parking zone where data is not recorded may be formed on an inner region of the disk 130 so that the head may stay therein. Generally, the former head parking system is referred to as a ramp-loading type head parking system, and the latter is referred to as a contact start stop (CSS) type head parking system.

The spindle motor 140 and the actuator 150 are installed on the base member 110. To this end, the base member 110 includes a spindle motor support 112 for supporting the spindle motor 140 and a pivot support 114 for supporting the actuator pivot 151.

The base member 110 has a first slot 171 and a second slot 181 for partially controlling its stiffness. The first slot 171 is formed on the circumference of the spindle motor support 112, and the second slot 181 is formed on the circumference of the pivot support 114. As shown in FIG. 6, the first slot 171 and the second slot 181 may extend completely through the base member 110.

Specifically, the first slot 171 is formed near the pivot support 114 on the circumference of the spindle motor support 112. In other words, the first slot 171 is located between the spindle motor support 112 and the pivot support 114. The first slot 171 having a narrow width is elongated near and along the circumference of the spindle motor support 112. The length of the first slot 171 may range from about one fourth to one half of the circumference of the spindle motor support 112. If the length of the first slot 171 is greater than about one half of the circumference of the spindle motor support 112, then the stiffness of the spindle motor support 112 is reduced so that the spindle motor support 112 may vibrate easily when the spindle motor 140 rotates. If the length of the first slot 171 is shorter than about one fourth of the circumference of the spindle motor support 112, then the first slot 171 cannot function properly.

Due to the first slot 171 being formed as described above, the stiffness of the spindle motor support 112 is less on the side of the first slot 171 than the opposite side. As a result, the spindle motor 140 installed in the spindle motor support 112 is easily inclined toward the first slot 171 when an external impact is applied vertically to the base member 110.

Further, one or a plurality of first auxiliary slots 172 may be formed on the circumference of the spindle motor support 112. The first auxiliary slots 172 are located opposite to the first slot 171, and are elongated with a narrow width near and along the circumference of the spindle motor support 112. The first auxiliary slots 172 are shorter than the first slot 171.

When there is a great difference in stiffness between the side of the first slot 171 of the spindle motor support 112 and the opposite side thereof due to the first slot 171, the first auxiliary slots 172 reduce the difference in stiffness.

The second slot 181 is elongated with a narrow width near and along the circumference of the pivot support 114. The second slot 181 is disposed on the circumference of the pivot support 114 opposite to the spindle motor support 112. For the same reason as for the first slot 171, the length of the second slot 181 may range from about one fourth to about one half of the circumference of the pivot support 114.

Due to the second slot 181 formed as described above, the stiffness of the pivot support 114 is less on the side of the second slot 181 than the opposite side thereof. As a result, the actuator pivot 151 installed on the pivot support 114 is easily inclined toward the second slot 181 when an external impact is applied vertically to the base member 110.

Further, one or a plurality of second auxiliary slots 182 may be formed on the circumference of the pivot support 114. The second auxiliary slots 182 are located on the circumference of the pivot support 114 opposite to the second slot 181. The second auxiliary slots 182 are formed with a narrow width near and along the circumference of the pivot support 114. The second auxiliary slots 182 are shorter than the second slot 181. The second auxiliary slots 182 perform the same function as the first auxiliary slots 172, i.e., reduce the difference in stiffness.

Figure 7:
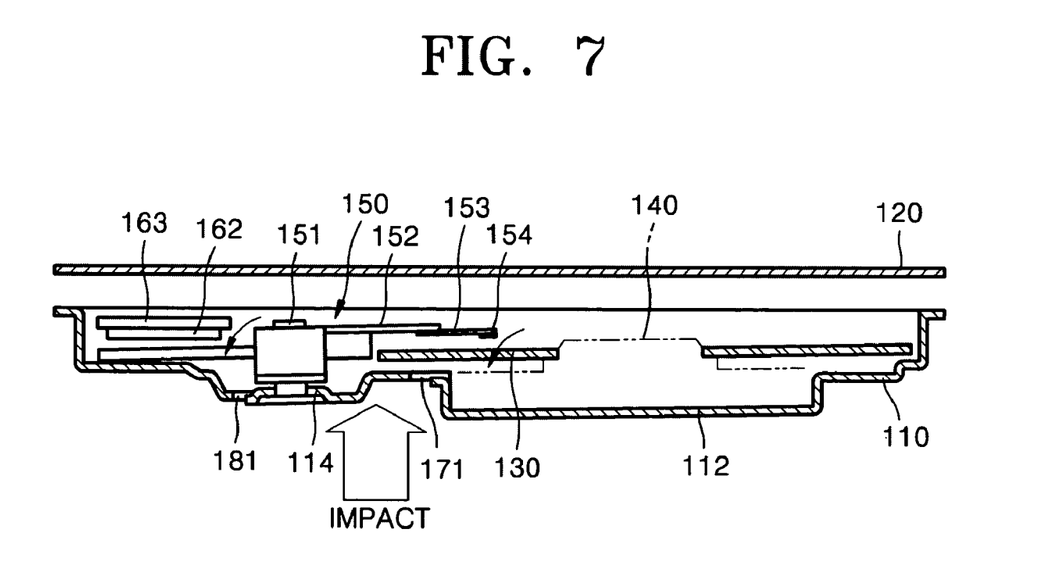
FIG. 7 is a sectional view of the disk drive consistent with the present invention to show a movement of a head and a disk when an external impact is applied to the disk drive.

Referring to FIG. 7, when an approximately vertical impact is applied to the base member 110 of the hard disk drive, the front end of the actuator 150 is bent down. However, the actuator pivot 151 is inclined toward the second slot 181 due to the impact so that the force acting on the slider 154 installed at the front end of the actuator 150 is offset, thereby reducing the speed of the slider 154 moving down toward the disk 130. The impact also causes the spindle motor 140 to be inclined toward the first slot 171 so that the disk 130 mounted on the spindle motor 140 becomes inclined in the same direction. Therefore, the disk 130 departs from the slider 154.

As such, a head slap in which the slider 154 collides with the disk 130 is reduced because of the speed of the slider 154 is reduced and the disk 130 becomes inclined in a direction departing from the slider 154. Even if a head slap occurs, the force of the impact applied to the head and the disk 130 is significantly alleviated, thereby minimizing the damage of the head and the disk 130 caused due to the head slap.

Hereinafter, the anti-shock characteristic of a hard disc drive consistent with the present invention will be described with reference to a simulation test, in comparison with a conventional hard disk.

Figure 8:
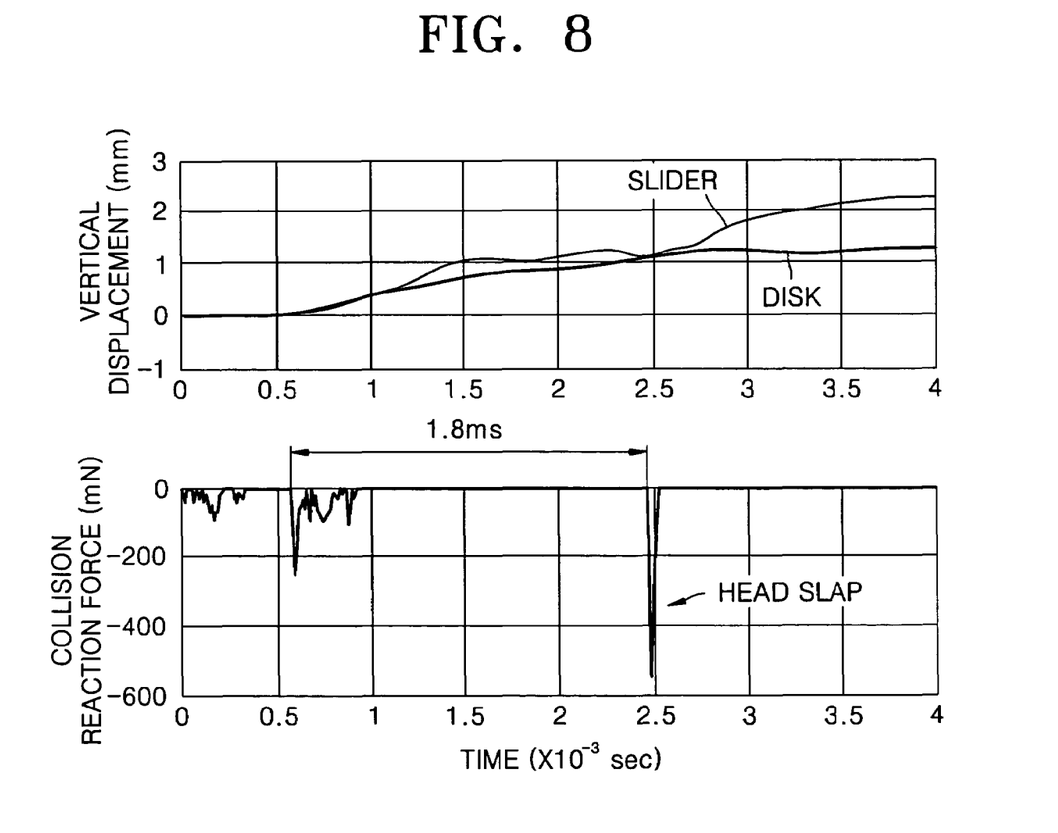
FIG. 8 is a graph illustrating a vertical displacement and a collision reaction force between a disk and a slider in a conventional disk drive when an external impact is applied to the disk drive.
Figure 9:
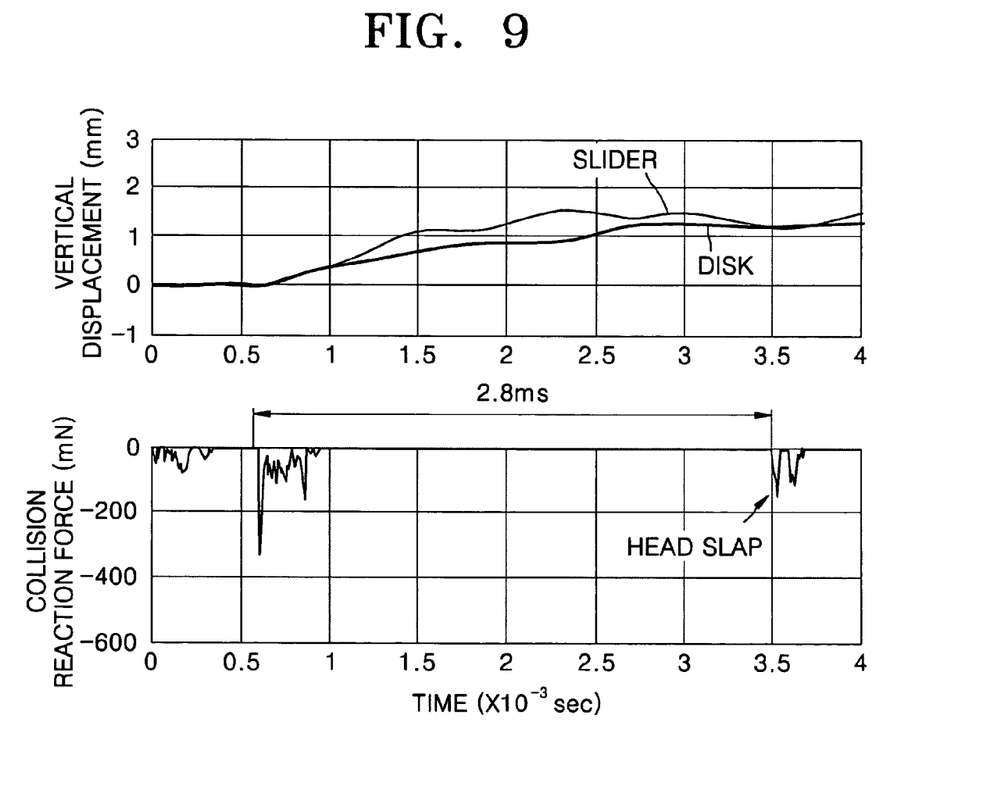
FIG. 9 is a graph illustrating a vertical displacement and a collision reaction force between the disk and the slider in the disk drive according to the present invention when an external impact is applied to the disk drive.

FIG. 8 is a graph illustrating a vertical displacement and a collision reaction force between a disk and a slider in a conventional hard disk drive when an external impact is applied to the hard disk drive. FIG. 9 is a graph illustrating a vertical displacement and a collision reaction force between the disk and slider in the hard disk drive according to the present invention when an external impact is applied to the hard disk drive.

As shown in FIG. 8, when a vertical impact of 200 G is externally applied to the conventional hard disk drive, a head slap occurs approximately in 1.8 ms. Here, due to a collision reaction force of over 500 mN, it is highly likely to damage the head and the disk. Meanwhile, referring to FIG. 9, when a vertical impact of 200 G is externally applied to the disk drive according to the present invention, a collision reaction force of 100 mN is generated approximately in 2.8 ms. As is apparent from FIGS. 8 and 9, with the assumption that an equal external impact is applied, the collision reaction force between the slider and the disk is significantly reduced in the disk drive of the present invention, compared to the conventional hard disk drive. Therefore, in the hard disk drive according to the present invention, the head and the disk are less likely to be damaged even by a strong external impact than in the conventional hard disk drive.

Figure 10:
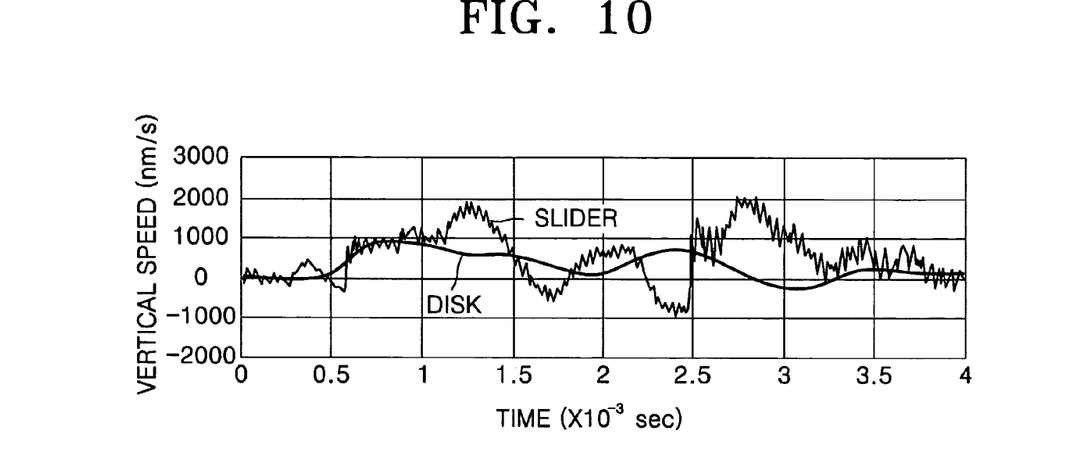
FIG. 10 is a graph illustrating variations in vertical speed of the slider in the conventional disk drive when an external impact is applied to the conventional disk drive.
Figure 11:
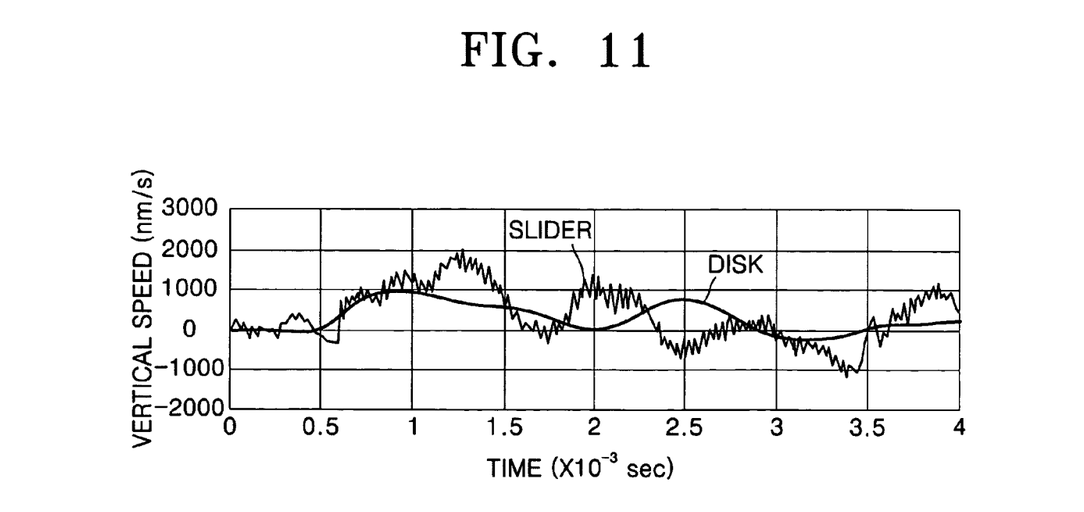
FIG. 11 is a graph illustrating variations in vertical speed of the slider in the disk drive according to the present invention when an external impact is applied to the disk drive.

FIG. 10 is a graph illustrating variations in vertical speed of the slider in the conventional hard disk drive when an external impact is applied to the conventional disk drive. FIG. 11 is a graph illustrating variations in vertical speed of the slider in the hard disk drive according to the present invention when an external impact is applied to the disk drive.

Referring to FIG. 10, in the conventional disc drive, the speed of the slider abruptly increases near 2.5 ms around which the slider collides with the disk. Meanwhile, referring to FIG. 11, in the disk drive according to the present invention, the speed of the slider gently increases near 3.5 ms around which the slider collides with the disk.

As described above, in a disk drive according to the present invention, slots are formed on the circumference of the spindle motor support and pivot support so that the spindle motor and the actuator pivot are inclined in the same direction when an external impact is applied. Therefore, a collision between the head and the disk, i.e., a head slap, is unlikely to occur, thereby minimizing damage to the head and the disk caused by the head slap and resulting in a more reliable read/write function of the head. Especially, the disk drive consistent with the present invention can satisfy a recent need for portable storage devices.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:
1. A disk drive comprising:
   a base member;
   a spindle motor supported by a spindle motor support formed on the base member, the spindle motor rotating a data storage disk;
   an actuator rotatably coupled to an actuator pivot supported by a pivot support formed on the base member, the actuator moving a read/write head to a position on a recording surface of the disk; and
   at least one slot formed in the base member around the circumference of each of the spindle motor support and the pivot support, the slots for partially controlling the stiffness of the base member and at least one of the slots extending completely through the base member,
   wherein the at least one slot formed in the base member around the circumference of the spindle motor support is curved and has a portion positioned between the spindle motor and the pivot support.

2. The disk drive of claim 1, wherein the slots comprise:
   a first slot formed on a circumference region of the spindle motor support near the pivot support; and
   a second slot formed on a circumference region of the pivot support opposite to the spindle motor support.

3. The disk drive of claim 2, wherein the first slot is elongated near and along the circumference of the spindle motor support, and the second slot is elongated near and along the circumference of the pivot support.

4. The disk drive of claim 3, wherein a length of the first slot ranges from one fourth to one half of the circumference of the spindle motor support, and a length of the second slot ranges from one fourth to one half of the circumference of the pivot support.

5. The disk drive of claim 2, wherein at least one first auxiliary slot is formed on a circumference region of the spindle motor support opposite to the first slot, and at least one second auxiliary slot is formed on a circumference region of the pivot support opposite to the second slot.

6. The disk drive of claim 5, wherein a plurality of first auxiliary slots and a plurality of second auxiliary slots are formed.

7. The disk drive of claim 5, wherein the first auxiliary slot is shorter than the first slot, and the second auxiliary slot is shorter than the second slot.

8. The disk drive of claim 1, wherein the slot having a portion positioned between the spindle motor support and the pivot support is longer than the at least one slot around the circumference of the pivot support.

9. The disk drive of claim 1, wherein the actuator has an actuator arm that extends directly over the slot having a portion positioned between the spindle motor support and the pivot support.

10. The disk drive of claim 1, wherein the slot having a portion positioned between the spindle motor support and the pivot support is a continuous curve that follows a shape of the spindle motor support.

11. The disk drive of claim 1, wherein the at least one slot formed in the base member around the circumference of the pivot support is a continuous curve that follows a shape of the pivot support.

12. The disk drive of claim 1, wherein a plurality of slots are provided around the circumference of the spindle motor support so as to form spindle motor support slots and a plurality of slots are provided around the circumference of the pivot support to form pivot support slots, and wherein at least one of the pivot support slots is longer than other pivot support slots, and at least one of the spindle motor support slots is longer than other spindle motor support slots.

13. A disk drive comprising:
a base member;
a spindle motor supported by a spindle motor support formed on the base member, the spindle motor rotating a data storage disk;
an actuator rotatably coupled to an actuator pivot supported by a pivot support formed on the base member, the actuator moving a read/write head to a position on a recording surface of the disk; and
at least one slot formed in the base member around the circumference of each of the spindle motor support and the pivot support, the slots for partially controlling the stiffness of the base member,
wherein the at least one slot formed in the base member around the circumference of the spindle motor support is curved and has a portion positioned between the spindle motor and the pivot support,
wherein the slots comprise:
a first slot formed on a circumference region of the spindle motor support near the pivot support; and
a second slot formed on a circumference region of the pivot support opposite to the spindle motor support,
wherein the first slot is elongated near and along the circumference of the spindle motor support, and the second slot is elongated near and along the circumference of the pivot support, and
wherein a length of the first slot ranges from one fourth to one half of the circumference of the spindle motor support, and a length of the second slot ranges from one fourth to one half of the circumference of the pivot support.

14. A disk drive comprising:
a base member;
a spindle motor supported by a spindle motor support formed on the base member, the spindle motor rotating a data storage disk;
an actuator rotatably coupled to an actuator pivot supported by a pivot support formed on the base member, the actuator moving a read/write head to a position on a recording surface of the disk; and
at least one slot formed in the base member around the circumference of each of the spindle motor support and the pivot support, the slots for partially controlling the stiffness of the base member,
wherein the at least one slot formed in the base member around the circumference of the spindle motor support is curved and has a portion positioned between the spindle motor and the pivot support,
wherein the slots comprise:
a first slot formed on a circumference region of the spindle motor support near the pivot support; and
a second slot formed on a circumference region of the pivot support opposite to the spindle motor support, and
wherein at least one first auxiliary slot is formed on a circumference region of the spindle motor support opposite to the first slot, and at least one second auxiliary slot is formed on a circumference region of the pivot support opposite to the second slot.

15. The disk drive of claim 14, wherein a plurality of first auxiliary slots and a plurality of second auxiliary slots are formed.

16. The disk drive of claim 14, wherein the first auxiliary slot is shorter than the first slot, and the second auxiliary slot is shorter than the second slot.

17. A disk drive comprising:
a base member;
a spindle motor supported by a spindle motor support formed on the base member, the spindle motor rotating a data storage disk;
an actuator rotatably coupled to an actuator pivot supported by a pivot support formed on the base member, the actuator moving a read/write head to a position on a recording surface of the disk; and
at least one slot formed in the base member around the circumference of each of the spindle motor support and the pivot support, the slots for partially controlling the stiffness of the base member,
wherein the at least one slot formed in the base member around the circumference of the spindle motor support is curved and has a portion positioned between the spindle motor and the pivot support, and
wherein the slot having a portion positioned between the spindle motor support and the pivot support is longer than the at least one slot around the circumference of the pivot support.

18. The disk drive of claim 17, wherein the actuator has an actuator arm that extends directly over the slot having a portion positioned between the spindle motor support and the pivot support.

19. The disk drive of claim 17, wherein the slot having a portion positioned between the spindle motor support and the pivot support is a continuous curve that follows a shape of the spindle motor support.

20. The disk drive of claim 17, wherein the at least one slot formed in the base member around the circumference of the pivot support is a continuous curve that follows a shape of the pivot support.

21. A disk drive comprising:
   a base member;
   a spindle motor supported by a spindle motor support formed on the base member, the spindle motor rotating a data storage disk;
   an actuator rotatably coupled to an actuator pivot supported by a pivot support formed on the base member, the actuator moving a read/write head to a position on a recording surface of the disk; and
   at least one slot formed in the base member around the circumference of each of the spindle motor support and the pivot support, the slots for partially controlling the stiffness of the base member,
   wherein the at least one slot formed in the base member around the circumference of the spindle motor support is curved and has a portion positioned between the spindle motor and the pivot support,
   wherein a plurality of slots are provided around the circumference of the spindle motor support so as to form spindle motor support slots and a plurality of slots are provided around the circumference of the pivot support to form pivot support slots, and wherein at least one of the pivot support slots is longer than other pivot support slots, and at least one of the spindle motor support slots is longer than other spindle motor support slots.

* * * * *